UNITED STATES PATENT OFFICE.

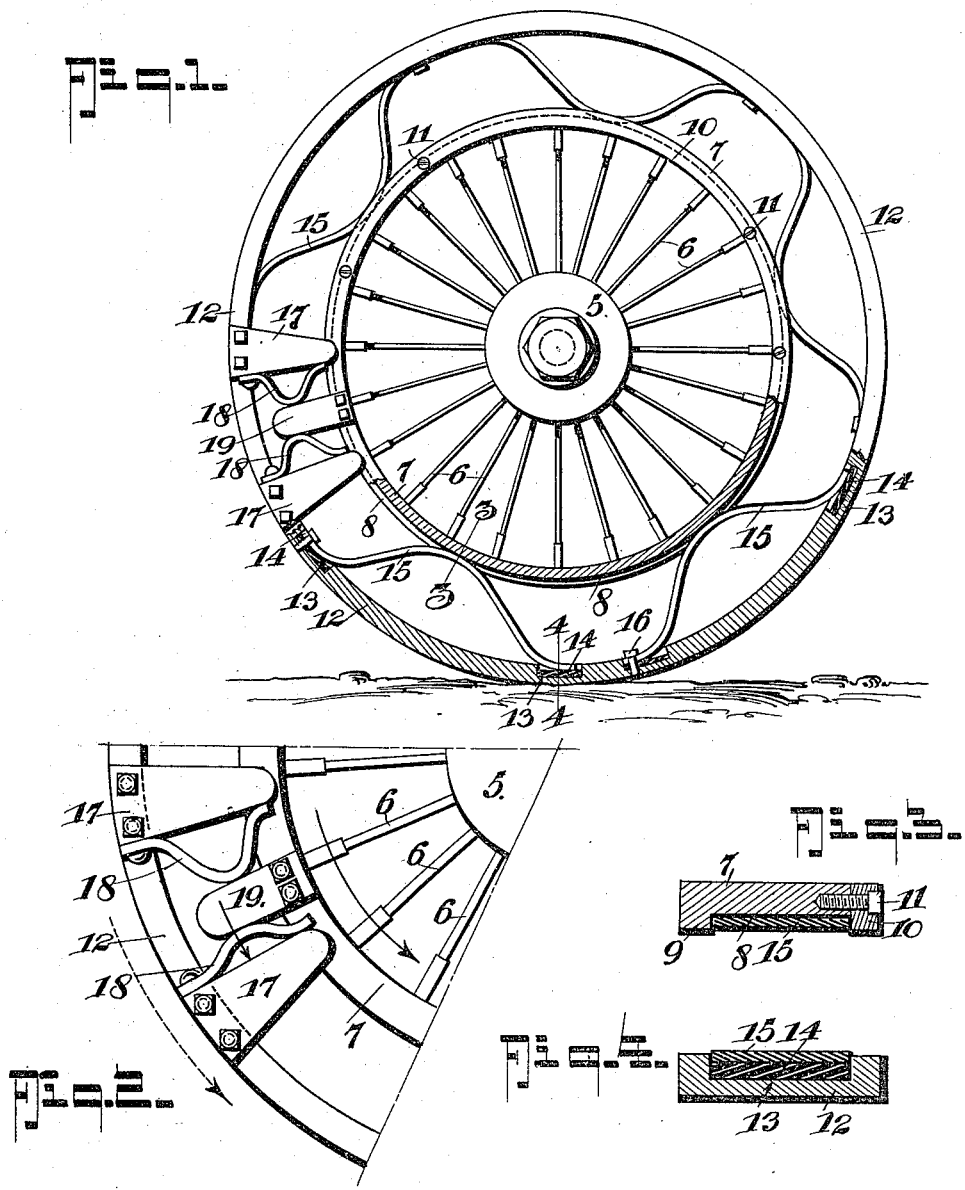

GEORGE WILBER WATTS, OF HOT SPRINGS, ARKANSAS.

RESILIENT WHEEL.

1,173,071.  Specification of Letters Patent.  Patented Feb. 22, 1916.

Application filed October 1, 1915. Serial No. 53,546.

*To all whom it may concern:*

Be it known that I, GEORGE WILBER WATTS, a citizen of the United States, and a resident of Hot Springs, in the county of Garland and State of Arkansas, have invented an Improvement in Resilient Wheels, of which the following is a specification.

This invention is an improvement in vehicle wheels and has particular reference to a novel construction of springs for absorbing shocks incident to the travel of a vehicle.

An object of the invention is to provide a wheel having an inner hub member and outer rim member between which are positioned a plurality of flat spring members each engaging, at both ends, the outer rim and, intermediate its ends, the inner hub member.

Another object is the provision of a pair of flanged members secured to the outer rim and extending inwardly, said members each having fastened thereto a spring adapted for engagement with an outwardly extending contact plate carried by the inner hub member whereby relative movement between the outer rim member and inner hub member is limited and cushioned.

The inventive idea involved is capable of receiving a variety of mechanical expressions, one of which, for the purpose of illustrating the invention, is shown in the accompanying drawing, in which—

Figure 1 is a side elevation of the wheel partly in section and constructed in accordance with the invention. Fig. 2 is an enlarged fragmentary view of one portion of the wheel. Fig. 3 is a section on the line 3—3 of Fig. 1. Fig. 4 is a section on the line 4—4 of Fig. 1.

Referring more particularly to the accompanying drawing, the numeral 5 indicates the inner hub member of the wheel consisting of a plurality of spokes 6 and the rim 7 which is provided with a continuous channel 8 formed by an annular integral flange 9 on one edge thereof and a detachable ring 10 on the other edge, said ring being secured in position by the screw bolts 11. The wheel is also provided with an outer rim 12 having at intervals a plurality of recesses 13 arranged in pairs and having mounted therein resilient cushions 14 preferably made of rubber. A plurality of bowed springs 15 are associated with the inner hub member and outer rim member and each spring has one end secured in one of the recesses as indicated at 16 while the other end of the spring is loosely mounted in the next succeeding recess. These bowed springs are preferably made of a flat strip of metal and the intermediate portions thereof are adapted to engage the channel 8 formed in the inner hub member thus providing a resilient support for the same.

The invention also contemplates providing a resilient means for transmitting motion from the inner hub member to the outer rim member and also for absorbing shocks incident to travel. This means preferably includes a pair of tapered flanged members 17 arranged in spaced relation and secured to the outer rim member and extending inwardly toward the hub of the wheel. The flanged members 17, on their adjacent edges, each have one end of a small bowed spring 18 secured thereto. the free end of which engages the edge of the flanged member adjacent the inner end thereof and is adapted to slide along said edge when the same is compressed, as shown in Fig. 2. The inner hub member 5 carries a contact plate 19 which is interposed between the flanged members 17 and adapted to have the edges thereof engage the intermediate portions of the springs 18 whereby the motion imparted to said hub member through its axle is transmitted to the outer rim member. The compression of the spring 18, as shown in Fig. 2, will prevent the sudden shock usually incident to wheels of ordinary construction when a machine, for instance, is started.

What is claimed is:—

1. A vehicle wheel comprising an outer rim member, an inner hub member including a continuous rim arranged concentrically to said outer rim member, inwardly extending flange members secured to said outer rim member, bowed springs each having one end secured to an edge of one of the flange members and also having its free end contacting said edge, and a contact plate secured to the rim of the inner hub member and interposed between said inwardly extending members whereby to contact the intermediate portions of said bowed springs, and cushioning means between said outer rim and inner hub members.

2. A vehicle wheel comprising an inner hub member, an outer rim member having recesses therein, flat resilient cushions in said recesses, and bowed springs each having one end thereof secured in one of said recesses and bearing against said cushion and its other end freely engaging the cushion in the next adjacent recess whereby the latter end is movable longitudinally of said recess, the intermediate portions of each spring engaging said inner hub member.

GEORGE WILBER WATTS.

Witnesses:
JAS. B. FOOTE,
M. H. McLINDON.

Copies of this patent may be obtained for five cents each, by addressing the "Commissioner of Patents, Washington, D. C."